United States Patent [19]

Simpson, III

[11] Patent Number: 5,142,929
[45] Date of Patent: Sep. 1, 1992

[54] BALL NUT WITH TANGENTIAL NO LOAD-GUIDED RETURN PATH

[75] Inventor: Glenn R. Simpson, III, Hartland, Wis.

[73] Assignee: Robec, Inc., San Carlos, Calif.

[21] Appl. No.: 677,797

[22] Filed: Mar. 29, 1991

[51] Int. Cl.⁵ .............................................. F16H 55/17
[52] U.S. Cl. .................................. 74/459; 74/424.8 R
[58] Field of Search ................. 74/89.15, 424.8 R, 459

[56] References Cited

U.S. PATENT DOCUMENTS

| | | | |
|---|---|---|---|
| 2,855,792 | 10/1958 | Gates | 74/459 |
| 3,301,082 | 1/1967 | Kosinski | 74/459 X |
| 3,815,435 | 6/1974 | Eschenbacher et al. | 74/459 |
| 3,924,486 | 12/1975 | Taillardat | 74/459 |
| 3,961,541 | 6/1976 | Fund et al. | 74/459 |
| 3,971,264 | 7/1976 | Detraz et al. | 74/459 |
| 4,074,585 | 2/1978 | Richaud et al. | 74/459 X |
| 4,905,534 | 3/1990 | Andonegui | 74/459 |
| 5,005,436 | 4/1991 | Brusasco | 74/459 |

Primary Examiner—Allan D. Herrmann
Assistant Examiner—David W. Laub
Attorney, Agent, or Firm—Flehr, Hohbach, Test, Albritton & Herbert

[57] ABSTRACT

A ball nut (60) has internal return paths (62) for a pair of parallel helical tracks (64). The return paths (62) are formed by grooves (66) machined into the body of the ball nut (60) from one end of the helical tracks (64) to the other. Return guide covers (68) and return guide inserts (69) are inserted into the ball groove tracks (64) on each end of the tracks. These covers (68) and inserts (69) divert the ball bearings through the grooves (66) and into the opposite end of the circuit formed by the helical tracks (64). The ball bearings (82) are deflected by the return guide insert (69) smoothly in a tangential path from the helical track (64). Thus, no abrupt change in direction for the ball bearings (82) while they are under load is encountered.

15 Claims, 5 Drawing Sheets

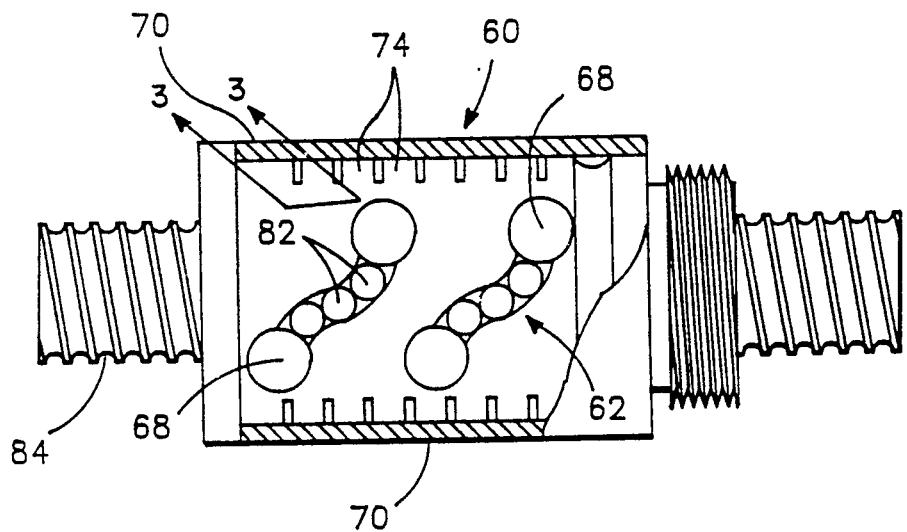
FIG.−2
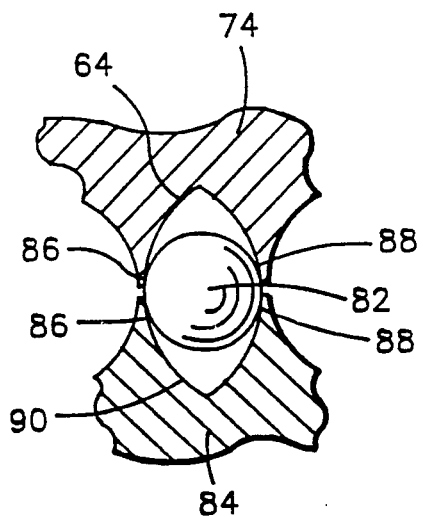
FIG.−3

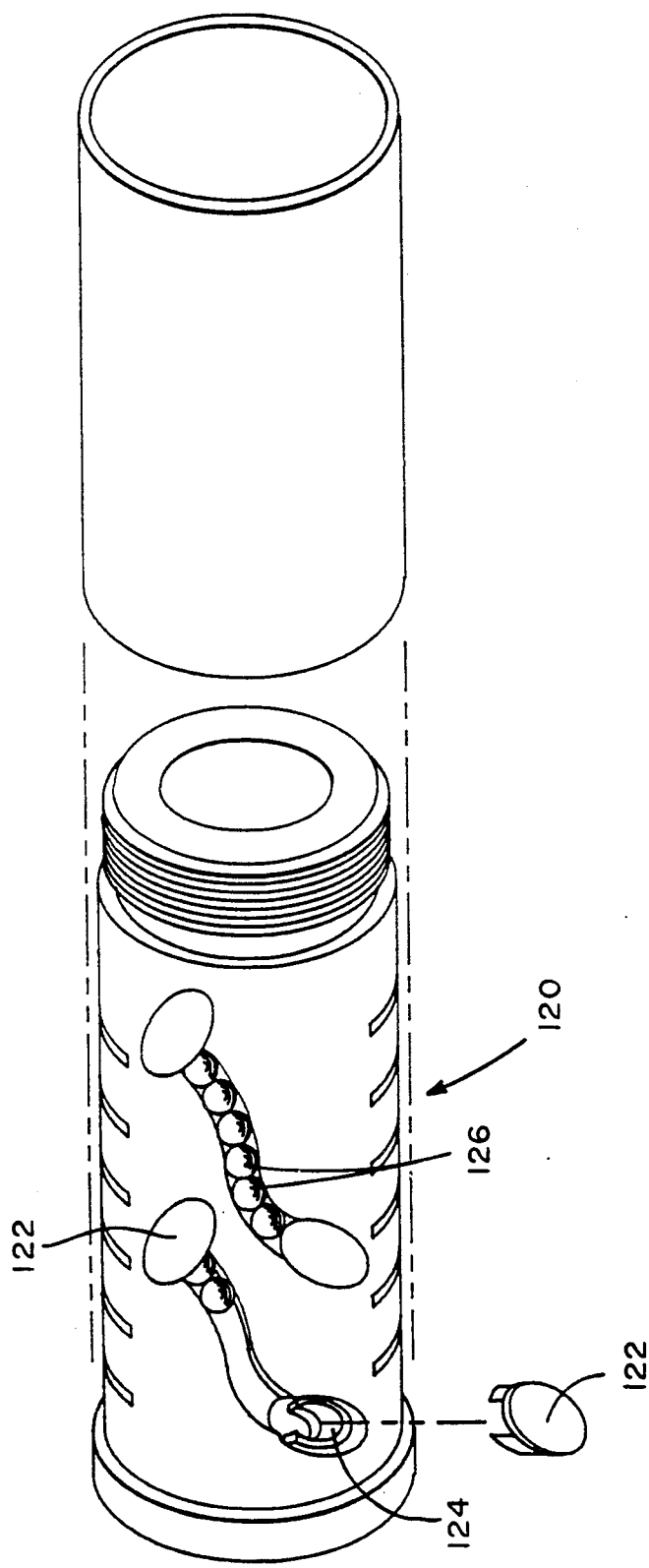
FIG.—9

BALL NUT WITH TANGENTIAL NO LOAD-GUIDED RETURN PATH

BACKGROUND OF THE INVENTION

1. Field of the Invention

The present invention relates generally to an improved ball nut for use in combination with ball screws to give a positioning assembly. More particularly, it relates to such a ball nut in which abrupt changes in direction in a return path for ball bearings in the ball nut are avoided. Most especially, it relates to such a ball nut with an internal return path.

2. Description of the Prior Art

In conventional ball screw assemblies, a ball nut travels along a lead screw. Ball bearings are positioned between one or more sets of helical threads on an inside surface of the ball nut and corresponding helical threads on the lead screw. The ball nut and lead screw threads form a race for the ball bearings positioned between the threads. The ball bearings move in rolling contact in the threads as the lead screw and the ball nut are rotated with respect to one another. As the lead screw and the ball nut rotate with respect to one another, the ball bearings travel along the helical threads on the inside surface of the ball nut, are removed at one end of those helical threads by a pick-off member and are delivered by a return path to an opposite end of the helical threads, so that the ball bearings are constantly recirculated in the race as the lead screw and ball nut continue to rotate with respect to each other. Ball screw assemblies having both external and internal return paths are known in the art.

Examples of prior art ball screw assemblies are shown in the following issued U.S. Pat. Nos.: 3,902,377, issued Sept. 2, 1975 to Lemor; 4,074,585, issued Feb. 21, 1978 to Richaud et al.; 4,074,587, issued Feb. 21, 1978; U.S. Pat. No. 4,138,902, issued Feb. 13, 1979 and 4,186,620, issued Feb. 5, 1980, all to Brusasco; U.S. Pat. No. 4,211,125, issued Jul. 8, 1980 to Benton; U.S. Pat. No. 4,258,584, issued Mar. 31, 1981 to Haegele et al.; U.S. Pat. No. 4,274,297, issued Jun. 23, 1981 to Blaurock et al.; U.S. Pat. No. 4,357,838, issued Nov. 9, 1982 to Blaurock et al.; U.S. Pat. No. 4,439,011, issued Mar. 27, 1984 to Machmerth; U.S. Pat. No. 4,660,431, issued Apr. 28, 1987 to Heine and U.S. Pat. No. 4,896,552, issued Jan. 30, 1990 to Virga. As disclosed in these issued patents, it is known in such ball screw assemblies to provide a pick-off for the ball bearings at the entrance to the return path which is tangential to the helical threads forming the race between the ball nut and the lead screw. However, the prior art structures for providing tangential pick-offs are complex and expensive.

SUMMARY OF THE INVENTION

Accordingly, it is an object of this invention to provide a ball nut and a ball screw assembly having a tangential pick-off in a simplified structure.

It is a further object of the invention to provide such a ball nut and a ball screw assembly in which the balls are picked off under a no-load condition.

The attainment of these and related objects may be achieved through use of the novel ball nut and ball screw assembly herein disclosed. A ball nut in accordance with this invention has a body with an axial bore extending through the body. At least one substantially helical path track on the axial bore receives a plurality of ball bearings for engaging threads of a lead screw. At least one return path for the plurality of ball bearings connects ends of the substantially helical path track. At least one pick-off for the ball bearings connects the at least one substantially helical path track and the at least one return path. The at least one pick-off engages the at least one substantially helical path track tangent to the at least one substantially helical path track. The pick-off comprises a return guide insert engaging the at least one substantially helical path track and the return path includes a return guide cover engaging the return guide insert. The return guide insert and the return path guide each have mating curved passages to define a smooth curve path from the at least one substantially helical path track to the at least one return path.

A ball nut assembly in accordance with the invention includes the ball nut and a lead screw in the axial bore. A plurality of ball bearings are between the substantially helical path track and the lead screw.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 2 is a top view of a ball screw assembly including the ball nut of FIG. 1, with a partial cross section to show interior detail;

FIG. 3 is an enlarged cross-section view, taken along the line 3—3 in FIG. 2.

FIG. 9 is an isometric, partially exploded view of a ball nut, corresponding to FIG. 1, but of another embodiment in accordance with the invention.

DETAILED DESCRIPTION OF THE INVENTION

Figure 1:
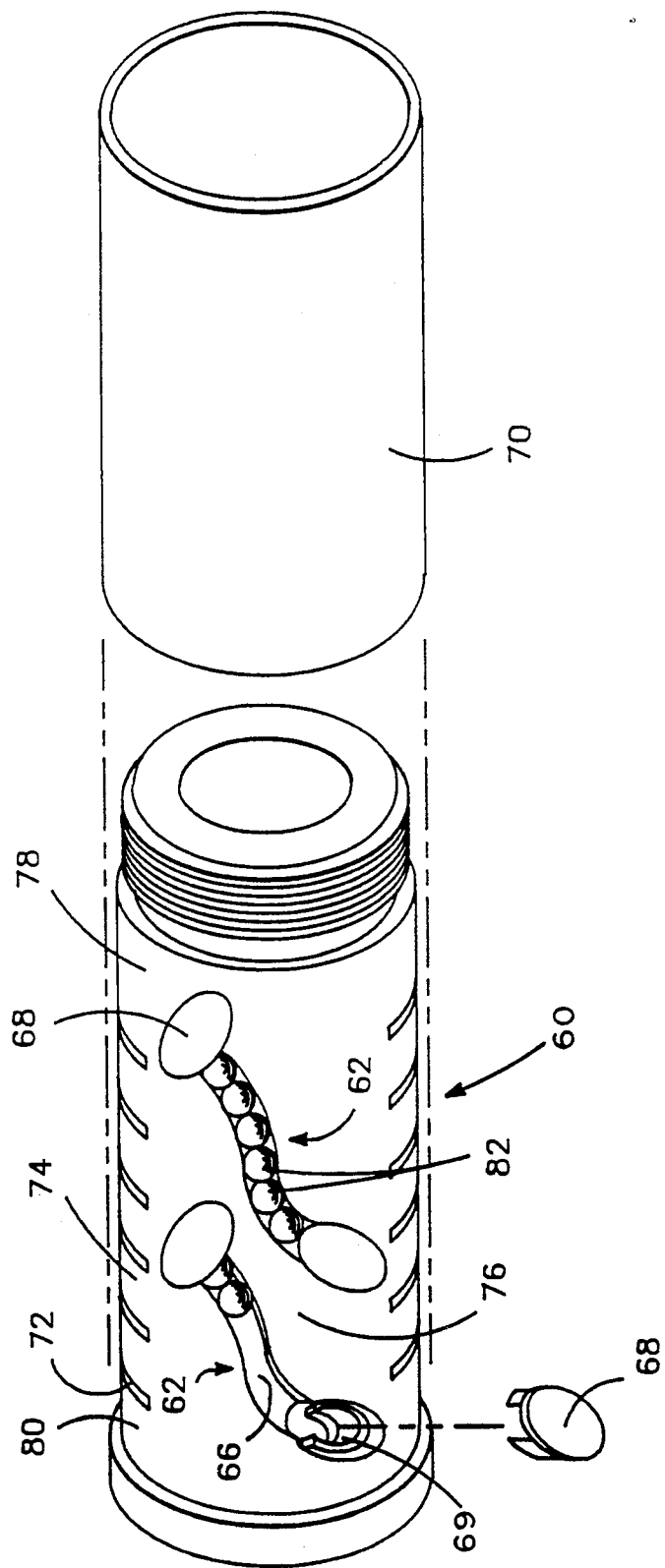
FIG. 1 is an isometric, partially exploded view of a ball nut in accordance with the invention.

Turning now to the drawings, more particularly to FIGS. 1 and 2, there is shown a ball nut 60 having internal return paths 62 for a pair of parallel helical tracks 64 (see FIG. 3). The return paths 62 are formed by grooves 66 machined into the body of the ball nut 60 from one end of the helical tracks 64 to the other. Return guide covers 68 and return guide inserts 69 are inserted into the ball groove tracks 64 on each end of the tracks. These covers 68 and inserts 69 divert the ball bearings through the grooves 66 and into the opposite end of the circuit formed by the helical tracks 64. The outside diameter of the ball nut 60 is covered by a friction fit sleeve 70 to retain the ball bearings in the grooves 66.

In a preferred form of the invention, the ball nut 60 has a plurality of essentially C shaped slots 72, defining a plurality of rib segments 74 connected to a backbone spine 76, which connects head and tail sections 78 and 80 of the ball nut 60. The rib segments 74 supply flexibility to the ball nut 60. Because of their C spring shape, they will flex slightly, altering the pitch of the portion of the ball groove tracks 64 that is contained inside the rib segment 74. Each rib segment 74 acts independently, flexing to alter the pitch as the variations of the lead screw affect the rolling path of ball bearings 82 circulating within the ball groove tracks 64. The ball bearings 82 are selectively sized to create an interference fit within the ball circuit when ball screw 84 and the ball nut 60 are assembled. Without the flexibility of the rib segments 74, the ball bearings would jam inside the ball circuit, causing the assembly to run rough, if at all. The rib segments 74 respond to the potential points of interference, by moving slightly to relieve jamming. Conversely, when variations in the ball groove tracks 64 would cause play in the circuit, the rib segments 74 flex to cause compression, keeping the preload on the ball bearings. Further details on ball screw assemblies incorporating C-shaped rib segments are available in a copending, commonly-assigned, concurrently filed application Ser. No. 07/678,538 by Joseph P. Virga and Glenn R. Simpson III, entitled "Flexible Ribbed, No-Backlash Ball Nut," the disclosure of which is hereby incorporated by reference herein. It should be understood that, while the use of these flexible ribs is highly desirable and are incorporated in the presently preferred form of the invention, they are not necessary in order to use the novel no-load pickoff structure of this invention, described below.

Figure 4:
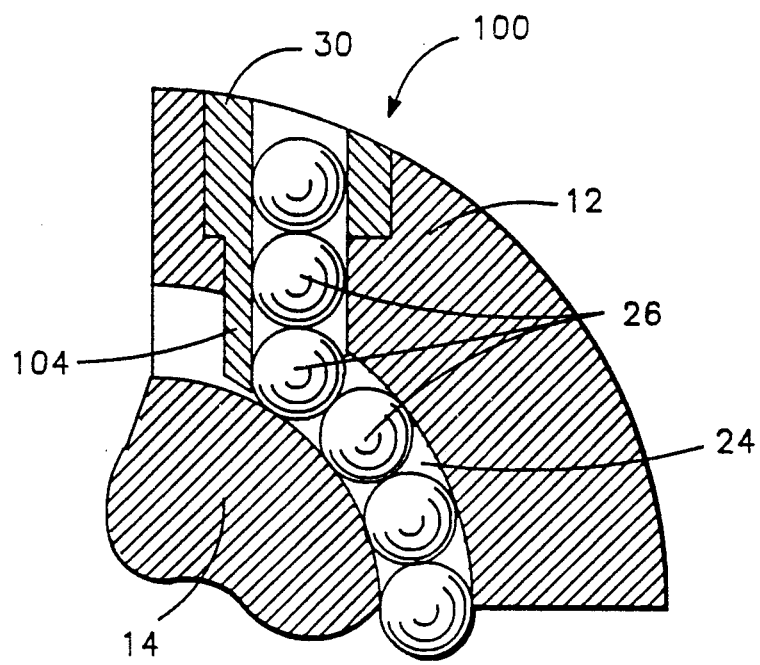
FIG. 4 is an enlarged cross-section view of a portion of a prior art ball nut.

As shown in FIG. 4, the ball groove tracks 64 have a "gothic arch" cross-section shape, formed by the intersection of two radii, which is by far the most commonly used track configuration in ball screw design. The rib segments 74 take advantage of the gothic arch shape. As the pitch of the ball screw 84 and ball nut 60 vary, the rib segments flex, keeping the ball bearings 82 in contact on at least two points 86 and 88 in the groove track 64 and groove 90 of ball screw 84. As the pitch varies, the rib segments 74 flex, allowing the ball bearings 82 to find the path of least resistance.

The area described by the gothic arch shape is always much larger than the nominal ball bearing diameter that it is designed to use. This allows for great variations in the diameters of the ball bearings 82 that can be used with the ball nut 60. Because of the larger size range that can be used in the groove track 64 and the groove 90, the correct diameter of ball bearings 82 to achieve the desired preload can be easily found without reaching the maximum ball bearing diameter that would fit the arches. It can be seen that the ball circle diameter will vary as the variations in the groove pitch cause the ball bearings to climb and descend the groove walls and as the diameter of the selected ball bearings 82 is increased or decreased to vary the preload obtained. The gothic arch groove 90 on the ball screw 84 remains fixed, because the screw 84 is solid. The pitch and grooves 64 inside the rib segments 74 flex. As in the case of the flexible ribs, the use of the gothic arch cross-section shape represents a preferred form of assemblies of this invention, but the crosssection shape could also be a full radius.

FIGS. 4 and 5-8 show return path system designs 100 and 102 for a prior art ball screw assembly and the ball screw assembly 60 of FIGS. 1-3, respectively. In FIG. 4, the return tube 30 has a conventional pickoff finger 104 that extends from the ball nut 12 into the helical track 24 toward the lead screw 14 to engage the ball bearings 26 for deflection from the helical track 24 into the return tube 30. The series of ball bearings 26 shows that the pick-off finger 104 produces an abrupt change of direction for the ball bearings 26 while they are still under load in the helical track 24.

Figure 5:
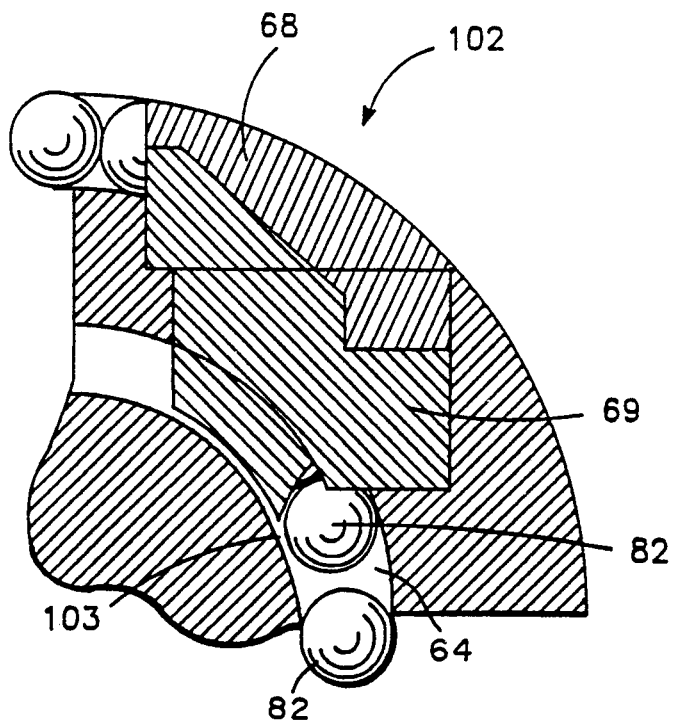
FIG. 5 is a cross-section view of a corresponding portion of the ball nut in FIGS. 1 and 2, taken along the line 5-5 in FIG. 2.
Figure 6:
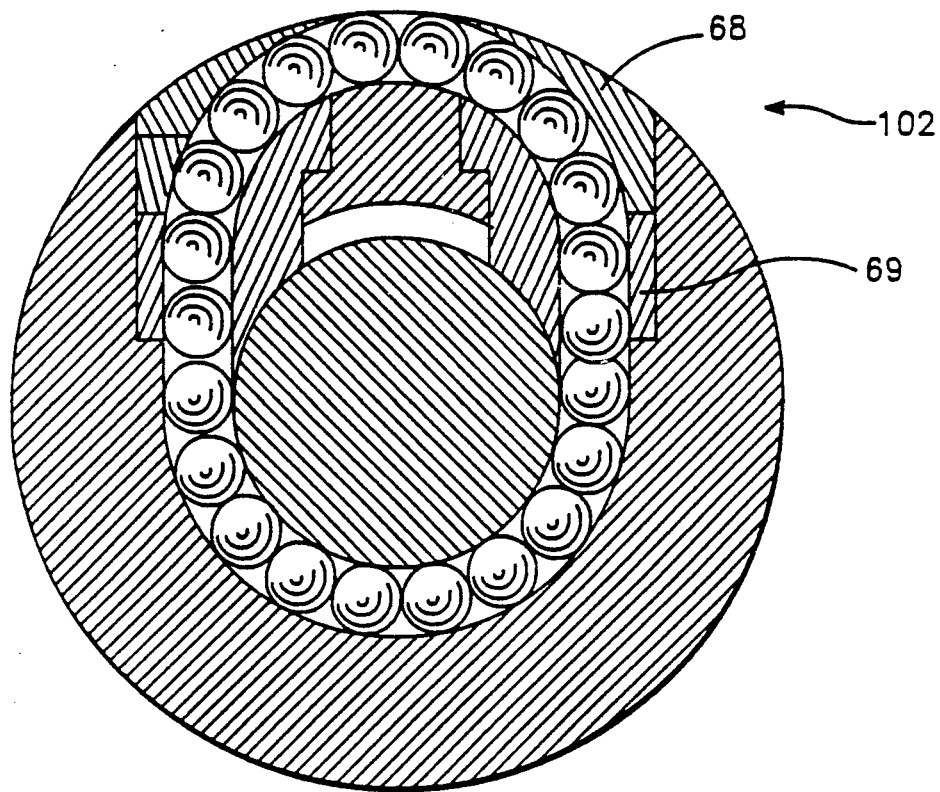
FIG. 6 is a cross-section view of the ball screw assembly of FIG. 2, taken along the line 6-6.
Figure 7:
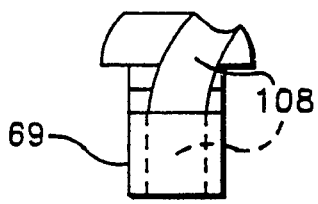
FIGS. 7 and 8 are perspective views of a portion of the ball screw assembly of FIGS. 1–3 and 5–6.
Figure 8:

In the return path system 102, the ball bearings 82 are guided from the helical track 64 and into the return path 62 by means of return guide insert 69 and the return guide cover 68. As is best shown in FIG. 5, the ball bearings 82 are guided by the return guide insert 69 smoothly in a tangential path under no load from the helical track 64. Thus, no abrupt change in direction for the ball bearings 82 while they are under load is encountered. The absence of load on the ball bearing 82 just entering the return guide insert is shown by the gap 103 between the ball bearing 82 and the wall of the helical track 64. As is best shown in FIGS. 7 and 8, the return guide insert 69 and the return guide cover 68 have tracks 108 and 110, respectively, which join together to connect the helical track 64 and the return path 62.

In practice, it has been found with the ball return system 102 that, for smooth operation, the ball bearings 82 should not make a turn or follow a path that has a radius of curvature less than twice the radius of the balls, whether under load or not.

FIG. 9 shows another ball nut 120 comparable to the ball nut 60 of FIG. 1, but without the slots 72 defining the rib segments 74 in the FIG. 1 embodiment. The ball nut 120 incorporates return guide covers 122 and return guide inserts 124 corresponding to the return guide covers 68 and return guide inserts 69 in the FIGS. 1-3 and 5-8 embodiment, to give the return path system design of this invention. The ball nut 120 is used for heavier loads and larger diameter ball nuts, such as 5/8 inch diameter and larger, where jamming of balls 126 in the ball circuit is not a problem. Other than as shown and described, the construction and operation of the FIG. 9 embodiment of the invention is the same as that of the FIGS. 1—3 and 5—8 embodiment.

It should now be readily apparent to those skilled in the art that a novel ball nut and ball nut assembly capable of achieving the stated objects of the invention has been provided.

It should further be apparent to those skilled in the art that various changes in form and details of the invention as shown and described may be made. It is intended that such changes be included within the spirit and scope of the claims appended hereto.

What is claimed is:

1. A ball nut, which comprises a body having an axial bore extending through said body, at least one substantially helical path track on said axial bore for receiving a plurality of ball bearings for engaging threads of a lead screw, at least one return path for said plurality of ball bearings connecting ends of said at least one substantially helical path track and at least one pick-off for said plurality of ball bearings connecting said at least one substantially helical path track and said at least one return path to deflect said plurality of ball bearings from said at least one substantially helical path track while said plurality of ball bearings are under no load, said at least one pick-off engaging said at least one substantially helical path track tangent to said at least one substantially helical path track, said at least one pick-off comprising a return guide insert engaging said at least one substantially helical path track and said at least one return path including a return guide cover engaging said return guide insert, said return guide insert and said return path cover each having mating curved passages to define a smooth curve path from said at least one substantially helical path track to said at least one return path, said at least one substantially helical path track being configured adjacent to said at least one pick-off so that one of said plurality of ball bearings is free of load when adjacent to said at least one pick-off.

2. The ball nut of claim 1 in which said at least one return path comprises a groove in an outer surface of said body, said ball nut additionally having a sleeve over the outer surface of said body.

3. The ball nut of claim 2 in which said body has a plurality of parallel substantially helical path tracks for receiving the plurality of ball bearings and a return path groove in the outer surface of said body for each of said plurality of parallel substantially helical path 4. The ball nut of claim 1 in which said at least one return path has one of said at least one return guide insert and one of said at least one return guide cover at each end of said return path, one of said at least one return guide insert and said return guide cover serving as one of said at least one pick-off, and another one of aid at least one return guide insert and said at least one return guide cover serving to supply said plurality of ball bearings from said at least one return path to said at least one substantially helical path track.

5. The ball nut of claim 1 in which said at least one substantially helical path track and said at least one pick-off are configured and positioned relative to one another so that one of said plurality of ball bearings entering said at least one pick-off is free of load when deflected from said at least one substantially helical path track by said at least one pick-off by providing a gap between the one of said plurality of ball bearings and said at least one substantially helical path track adjacent to said at least one pick off.

6. A ball nut assembly, comprising the ball nut of claim 1 in combination with a lead screw in said axial bore, and a plurality of ball bearings between said at least one substantially helical path track and said lead screw.

7. In a ball nut having a body with an axial bore having a spiral track for receiving a plurality of ball bearings between the spiral track and threads of a lead screw, a return path connecting first and second ends of the spiral track, and a pick-off connected between the first end of the spiral track and the return path, the improvement comprising said pick-off including a return guide insert engaging said spiral track and said return path including a return guide cover engaging said return guide insert, said return guide insert and said return path cover each having mating curved passages to define a smooth curve path from said spiral track to said return path, said spiral track being configured adjacent to said pick-off so that one of said plurality of ball bearings is free of load when adjacent to said pick-off.

8. The ball nut of claim 7 in which said return path comprises a groove in an outer surface of said body, said ball nut additionally having a sleeve over the outer surface of said body.

9. The ball nut of claim 8 in which said body has a plurality of parallel spiral tracks for receiving the plurality of ball bearings and a return path groove in the outer surface of said body for each of said plurality of parallel spiral tracks.

10. The nut of claim 7 in which said return path has said return guide insert and said return guide cover at a first end of aid return path and a second return guide insert and a second return guide cover at a second end of said return path, one of said return guide insert and said second return guide insert and said return guide cover and said second return guide cover serving as said pick-off, and another one of said return guide insert and said second return guide insert and said return guide cover and said second return guide cover serving to supply said plurality of ball bearings from said return path to said spiral track.

11. The ball nut of claim 7 in which said spiral track and said pick-off are configured and positioned relative to one another so that one of said plurality of ball bearings entering said pick-off is free of load when deflected from said spiral track by said pick-off by providing a gap between the one of said plurality of ball bearings and said spiral track adjacent to said pick off.

12. A ball nut assembly, comprising the ball nut of claim 6, a lead screw in said axial bore, and a plurality of ball bearings between said spiral track and said lead screw.

13. The ball nut of claim 1 in which said return guide cover and said return guide insert are configured so that said return guide cover fits over and engages said return guide insert to connect said return guide insert and said return path.

14. The ball nut of claim 7 in which said return guide cover and said return guide insert are configured so that said return guide cover fits over and engages said return guide insert to connect said return guide insert and said return path.

15. In a ball nut having a body with an axial bore having a spiral track for receiving a plurality of ball bearings between the spiral track and threads of a lead screw, a return path connecting first and second ends of the spiral track, a first pick-off connected between the first end of the spiral track and the return path, and a second pick-off connected between the second end of the spiral track and the return path, the improvement comprising said return path being formed in an outer surface of said body, said first and second pick offs including first and second return guide inserts respectively engaging the first and second ends of said spiral track and said return path including first and second return guide covers respectively engaging said first and second return guide inserts, said first and second return guide inserts and said first and second return path covers each having mating curved passages to define a smooth curve path from said spiral track to said return path, said first and second return guide covers and said first and second return guide inserts being configures so that said first and second return guide covers fit over and engage said first and second return guide inserts to connect said first and second return guide inserts and said return path, and a continuous, cylindrical sleeve fitting over said body and covering said return path, said first and second inserts and aid first and second return guide covers.

* * * * *